Patented May 30, 1939

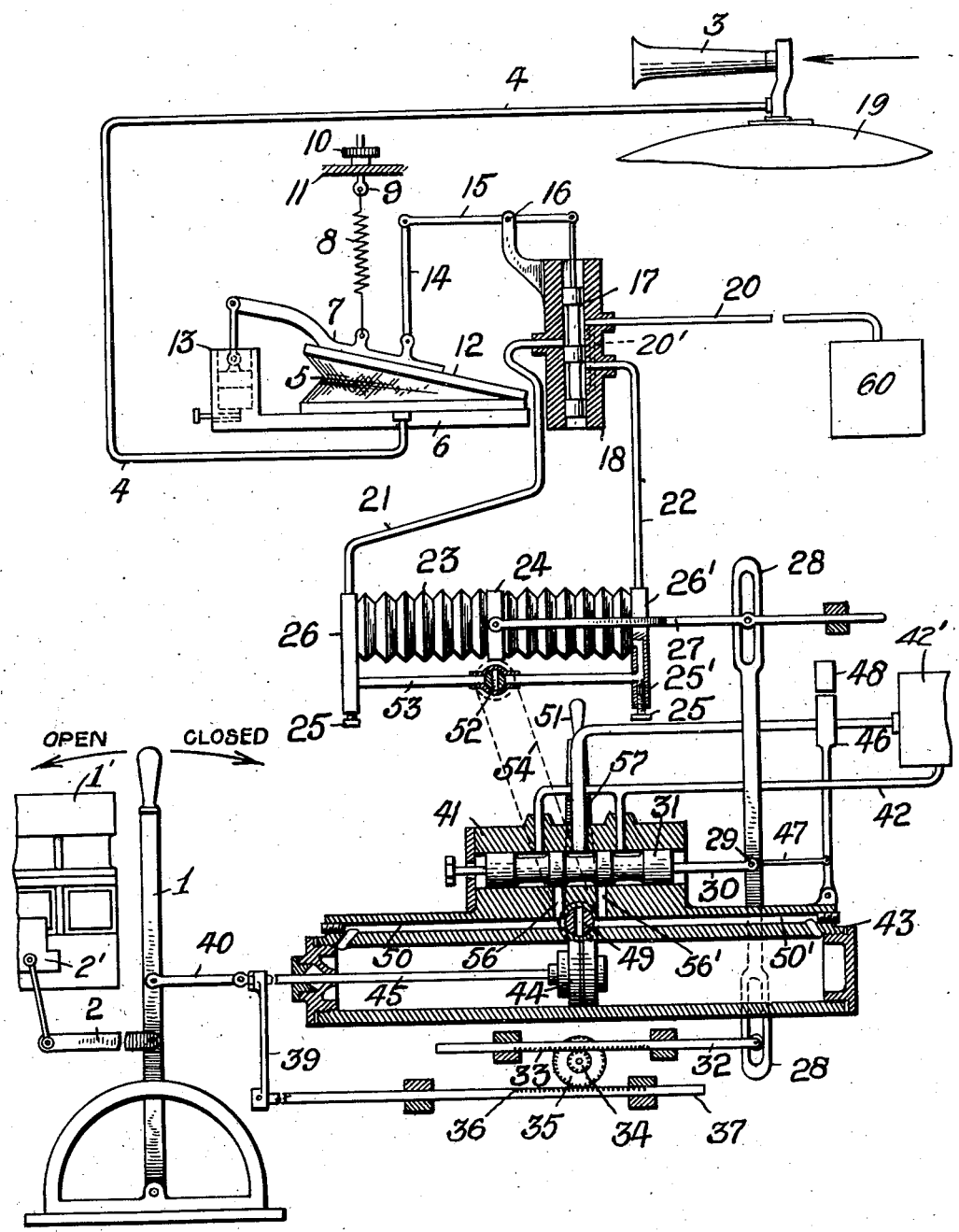

2,160,194

UNITED STATES PATENT OFFICE 2,160,194

AUTOMATIC ENGINE THROTTLE CONTROL

Mortimer F. Bates, Brooklyn, N. Y., assignor to Sperry Gyroscope Company, Inc., Brooklyn, N. Y., a corporation of New York Application March 25, 1936, Serial No. 70,794

8 Claims. (Cl. 244—1)

This invention relates, generally, to the speed control of aircraft and the invention has reference, more particularly, to a novel automatic engine throttle control adapted to maintain an aircraft at any desired predetermined air speed within the speed range of such aircraft.

In the operation of modern aircraft there are so many instruments and devices requiring the constant attention of the pilot that it is desirable, in order to avoid undue fatigue of the pilot and to eliminate the personal element as much as possible, to employ as many automatic devices as practicable, such, for example, as the automatic pilot disclosed and claimed in Patent No. 1,992,972 to Sperry et al.

The principal object of the present invention is to provide a novel automatic engine throttle control for aircraft that serves to automatically maintain the air speed of the aircraft substantially constant in flight at any set speed, within the speed range of the craft, desired by the pilot.

Another object of the present invention lies in the provision of a novel automatic engine throttle control of the above character, employing pneumatic control means operated from a Venturi air speed tube for controlling a hydraulic servo motor connected for operating the aircraft throttle, by-pass means being provided for enabling hand operation of the throttle when desired.

Still another object of the present invention is to provide a novel automatic engine throttle control of the above character that is reliable in operation, the same being free of electrical circuits and functioning smoothly and without hunting or jerking, a follow-up connection being employed from the throttle to the control means to assure smooth proportional throttle control as distinct from a hard-over control, the said invention being well suited for use in conjunction with the automatic pilot disclosed in the above identified patent.

Other objects and advantages will become apparent from the specification, taken in connection with the accompanying drawing wherein one embodiment of the invention is illustrated.

The single figure of the drawing is a schematic, part sectional view of the novel automatic engine throttle control of this invention as installed in an aircraft.

Referring now to the said drawing, the reference numeral 1 designates the engine throttle lever of the aircraft adapted to be automatically controlled by the means of this invention, the said lever being connected through suitable linkage 2 to the carburetor 2' of engine 1'. The reference numeral 3 designates a Venturi tube mounted in a convenient exposed position on the aircraft, as on the portion 19 thereof, and in the free air stream and directed so as to receive the oncoming air moving in the direction of the arrow shown in the drawing. Venturi 3 is connected by a conduit or tubing 4 to the interior of a collapsible pneumatic member or bellows 5 mounted on a base plate 6.

A casting 7 is shown fixed on the movable part 12 of pneumatic member 5 and has one end of a tension spring 8 attached thereto, the other end of spring 8 being attached to an eye screw 9 having a manually adjustable nut 10 thereon engaging a fixed part 11. By adjusting nut 10, the tension of spring 8 is varied, whereby this spring may be caused to support the movable part of pneumatic member or bellows 5 against the differential in pressure existing between the air within and that without the member 5. For any fixed adjustment of the nut 10, as the air speed of the aircraft rises or falls, the air pressure within bellows 5 will vary, causing movement of part 12 about its hinged connection with the stationary part of this bellows, which movement is preferably damped by a small dash-pot 13 mounted on base 6 and having its piston connected to casting 7.

Any movement of the bellows 5 is transmitted through link 14 and lever 15 fulcrumed at 16 to a balanced piston air valve 17 movable within a valve cylinder 18. Valve 17, when in its control position shown in the drawing, connects a vacuum line or pipe 20 to pipes 21 and 22 leading to the ends or heads 26 and 26' of an accordion pneumatic or double bellows 23, the connection to pipe 22 including passage 20' in the valve casing. Pipe 20 is connected to a vacuum pump 60 and when piston valve 17 is moved from its control position, one or the other of the pipes 21 and 22 is cut off from the suction pipe 20 so that the partition or movable element 24 of the accordion pneumatic 23 is caused to move toward that end of the pneumatic 23 upon which suction is still maintained. Air bleed valves 25 of the needle type are provided in the heads 26 and 26' for permitting air to bleed slowly into the accordion pneumatic 23 through inlet passage 25', thereby permitting movement of partition 24. By adjusting valves 25, the rate at which air is bled from the outside into the pneumatic 23 may be varied at will, but preferably the opening of these valves is kept at a minimum.

Movable partition 24 is connected by linkage 27 to one slotted end portion of a lever 28 pivoted intermediate its length at 29 upon the stem 30 of a balanced hydraulic or oil valve 31. The other end portion of lever 28 is also slotted and is connected through a suitable follow-up connection to the engine throttle lever 1. This follow-up connection is shown as comprising a link 32 connected at its end to lever 28 and having a rack 33 meshing with a gear 34 that is fixed to a concentric larger gear 35 meshing with a rack 36 provided on a link 37, this latter link being connected through yoke 39 and link 40 to engine throttle lever 1.

The balanced hydraulic or oil valve 31 is movable within a valve cylinder 41 and controls the flow of pressure fluid, such as oil, from a supply pipe 42 leading from pump 42' to the ends of a power cylinder 43 having an operating piston 44 movable therein. Piston 44 is connected through piston rod 45 and link 40 to the engine throttle lever 1. An indicating lever 46 is pivoted upon cylinder 43 and is connected by a link 47 to the pivot 29, whereby movements of the oil valve 31 cause corresponding movements of indicating lever 46. A fixed indication 48 is provided adjacent the lever 46, the indication 48 being so positioned that when lever 46 registers or is aligned with the same, the valve 31 is in its central or shut off position.

The power cylinder 43 is provided with a by-pass valve 49 for interconnecting passages 50 and 50' leading to opposite ends of cylinder 43 when the throttle 1 is operated manually. By-pass valve 49 is shown provided with an operating handle 51. The accordion pneumatic 23 is also shown provided with a by-pass valve 52 included in a pipe 53 connected to the ends of the member 23, a chain or other transmitting means 54 being shown as interconnecting valves 49 and 52 so that the movement of valve 49 to open position also moves valve 52 to open position.

In use, ordinarily in getting off the ground the pilot will open the by-pass valves 49 and 52 by turning handle 51 and then operate the throttle lever 1 manually until he gets the craft in the air, whereupon he will set the throttle lever 1 in the position giving him his desired air speed. He then adjusts the nut 10 until the indicating lever 46 registers with the fixed indicaton 48, showing that the balanced valve 31 is positioned in its central or neutral position. He then closes the by-pass valves 49 and 52 and the automatic throttle control starts to function and maintains the craft at the desired air speed.

Thus, suppose the automatic control is operating and that the air speed of the craft starts to drop off. The suction applied by venturi 3 to pneumatic member 5 will drop off, i. e., the air pressure within pneumatic member 5 will increase, causing movable part 12 to turn outwardly under the action of spring 8, thereby turning lever 15 clockwise and causing air valve 17 to move downwardly or in a direction to shut off the supply of vacuum to pipe 22, whereby partition 24 is caused to move toward the left in the drawing. This movement of partition 24 causes linkage 27 to actuate lever 28 and, since the follow-up connection or mechanism is stationary at this time, the lever 28 turns counter-clockwise about its pivotal connection with link 32, thereby moving oil valve 31 toward the left so that pressure fluid from pipe 42 flows around valve 31 into passage 56' of power cylinder 43. From passage 56' the pressure fluid flows into passage 50' and thence into the right hand end of cylinder 43, thereby actuating the piston 44 toward the left, the oil in advance of piston 44 being driven out through passages 50 and 56 and around valve 31 to exhaust pipe 57 leading to the oil reservoir and pump intake. Thus, throttle lever 1 is moved toward the left to further open the engine throttle for speeding up the engine to correct for the decrease in air speed. As the engine throttle lever 1 moves, the follow-up connection also moves; the link 37 moving toward the left and acting through gearing 34—35 to move link 32 at a slower rate toward the right, whereby the lower end of lever 28 is moved toward the right, thereby serving to move valve 31 back to its neutral position and stopping the opening movement of the throttle in a position to maintain the aircraft at the desired predetermined speed.

Likewise, if the craft should tend to speed up, the decreased pressure resulting in pneumatic member 5 would result in the raising of piston 17 so that the pipe 21 is shut off from the vacuum line 20, causing partition 24 to move toward the right, whereby valve 31 is caused to move toward the right and effect movement of throttle 1 toward closed position. As throttle 1 moves, it acts through the follow-up connection to move the lower end portion of lever 28 toward the left, thereby again returning valve 31 to neutral position and stopping the movement of the throttle lever 1.

Thus, the novel throttle control means of this invention serves to automatically maintain the air speed of the craft at any desired value regardless of the maneuvering of the craft or of other variable factors so long as the capacity of the engine or engines is not exceeeded. Should the pilot desire to change speed at any time, he merely operates handle 51 to open by-pass valves 49 and 52, whereupon he sets throttle 1 to desired position and then again closes the valves 49 and 52, obtaining automatic control. When the apparatus of this invention is used with an automatic pilot such as that disclosed in the previously mentioned Patent No. 1,992,972, the vacuum supply and the pressure fluid supply necessary for operating the apparatus of this invention are readily provided by the equipment of the automatic pilot.

In changing speed, the pilot need not operate the throttle lever 1 manually, but instead he may change speed by adjusting the tension of spring 8 through turning nut 10. Thus, by turning nut 10 so as to reduce the tension of spring 8, the speed of the craft is reduced, and by turning nut 10 so as to increase the tension of spring 8, the speed of the craft is increased.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In an aircraft, an engine throttle, a hydraulic cylinder and piston connected for automatically operating said throttle, by-pass means provided in connection with said cylinder for shutting off the same to enable manual operation and setting of said throttle, valve means for controlling the operation of said motor, a follow-up connection between said valve means and said throttle, and a pneumatic accordion the position of which is proportional to the speed of the aircraft free air stream also connected to said valve means, whereby, upon the manual setting of said throttle and the operation of said by-pass means to start said motor, said pneumatic means acting in conjunction with said follow-up connection so controls said valve means as to hold the air speed of the aircraft substantially constant without hunting and at the value determined by the initial manual setting of said throttle.

2. An automatic engine throttle control for aircraft comprising a hydraulic cylinder and piston motor connected for operating the engine throttle, a valve for controlling said motor, an operating lever pivotally connected intermediate its length to said motor, an accordion pneumatic connected to one end portion of said lever for effecting operation of said valve, a second accordion pneumatic responsive to variations in the air speed of the aircraft for controlling the operation of said first accordion pneumatic, and a follow-up connection between the other end portion of said lever and said throttle, whereby variations in the air speed of the aircraft effects proportional actuation of the aircraft throttle to correct for such variations to maintain constant air speed without hunting.

3. An automatic engine throttle control as in claim 2, wherein said pneumatic air speed responsive means comprises a Venturi tube and an air valve controlled therefrom for regulating the vacuum applied to said accordion pneumatic.

4. An automatic engine throttle control as in claim 2, wherein said accordion pneumatic comprises a double bellows having a movable central partition constituting the movable element for operating said valve, the ends of said pneumatic being connected to said pneumatic air speed responsive means.

5. The combination with an aircraft engine throttle, of a pressure fluid actuated motor connected for operating said throttle, and pneumatic air speed responsive means for controlling the operation of said motor, said last named means comprising a Venturi tube, a collapsible pneumatic member connected to said tube, adjustable spring means for offsetting the reduced air pressure within said collapsible pneumatic, a source of vacuum, a servo pneumatic accordion, an air valve connected to said source of vacuum and to said accordion pneumatic and arranged for operation by said collapsible pneumatic for controlling the supply of vacuum to the accordion pneumatic, and a valve operated by said servo pneumatic for operating said throttle.

6. In an automatic engine throttle control for aircraft, a hydraulic cylinder and piston for operating the engine throttle, a balanced oil valve for controlling the supply of pressure fluid to said motor, a lever for actuating said valve, and dual means for turning said lever, comprising an accordion bellows the stroke of which is proportional to air speed changes, and a follow-back connection from said piston to said valve and bellows, whereby the displacement of said piston is proportional to the movement of the bellows, whereby the amount of the throttle movement is directly proportional to changes in air speed.

7. In an automatic engine throttle control for aircraft, a hydraulic motor for operating the engine throttle, a balanced oil valve for controlling the supply of pressure fluid to said motor, a lever for actuating said valve, an accordion pneumatic having a movable element connected to said lever for moving the latter, a balanced air valve for controlling the supply of vacuum to said accordion pneumatic, Venturi controlled means for operating said air valve, and a follow-up connection between the engine throttle and said lever for also moving the latter.

8. In an automatic engine throttle control for aircraft, a hydraulic motor for operating the engine throttle, a balanced oil valve for controlling the supply of pressure fluid to said motor, a lever for actuating said valve, an accordion pneumatic having a movable element connected to said lever for moving the latter, a balanced air valve for controlling the supply of vacuum to said accordion pneumatic, a Venturi controlled collapsible pneumatic for operating said air valve, and spring means connected to said collapsible pneumatic for offsetting the reduced pressure therein, said spring means being adjustable to effect movement of said lever, whereby said balanced oil valve may be set to neutral position.

MORTIMER F. BATES.